(12) United States Patent
Ito et al.

(10) Patent No.: US 7,306,151 B2
(45) Date of Patent: Dec. 11, 2007

(54) METHOD AND APPARATUS FOR OPTICALLY READING INFORMATION FROM OBJECT BASED ON CONTROL OF OPTICAL PATH LENGTH

(75) Inventors: Kunihiko Ito, Chiryu (JP); Hisashi Shigekusa, Okazaki (JP)

(73) Assignee: Denso Wave Incorporated, Tokyo (JP)

( * ) Notice: Subject to any disclaimer, the term of this patent is extended or adjusted under 35 U.S.C. 154(b) by 490 days.

(21) Appl. No.: 10/953,036

(22) Filed: Sep. 30, 2004

(65) Prior Publication Data

US 2005/0067494 A1 Mar. 31, 2005

(30) Foreign Application Priority Data

Sep. 30, 2003 (JP) ............................. 2003-340207

(51) Int. Cl.
 *G06K 7/10* (2006.01)
(52) U.S. Cl. ............. 235/454; 235/462.33; 235/462.24
(58) Field of Classification Search ................ 235/454, 235/462.23, 462.24
 See application file for complete search history.

(56) References Cited

U.S. PATENT DOCUMENTS 4,818,847 A * 4/1989 Hara et al. ................... 235/455
5,216,230 A 6/1993 Nakazawa
5,912,447 A * 6/1999 Bjorner et al. ............... 235/454

FOREIGN PATENT DOCUMENTS

JP 7-319990 12/1995

OTHER PUBLICATIONS

First Office Action from Chinese Patent Office issued on May 29, 2006 for the corresponding Chinese patent application No. 200410083464.X (a copy and English translation thereof).

* cited by examiner

*Primary Examiner*—Michael G. Lee
*Assistant Examiner*—Allyson N Trail
(74) *Attorney, Agent, or Firm*—Posz Law Group, PLC

(57) ABSTRACT

An optical information reading apparatus for reading information codes such as a bar code and a two-dimensional code includes, an image-forming lens fixed at a given point and imaging a reflection light from the information code, an optical sensor locating at a position relative to that of the image-forming lens and receiving an image formed by the image-forming lens, a light path bending unit bending the reflection light between the image-forming lens and the optical sensor a plurality of times, a shifter shifting the light path bending unit, a distance measurement unit measuring the distance from the information code to the reading apparatus and a controller controlling the shifter based on the measurement result of the distance measurement unit. The light path length between the image-forming lens and the optical sensor is changed by shifting the light path bending unit using the shifter.

22 Claims, 10 Drawing Sheets

METHOD AND APPARATUS FOR OPTICALLY READING INFORMATION FROM OBJECT BASED ON CONTROL OF OPTICAL PATH LENGTH

CROSS-REFERENCE TO RELATED APPLICATION

This application is based on and incorporates herein by reference Japanese Patent Application No. 2003-340207 filed on Sep. 30, 2003.

BACKGROUND OF THE INVENTION

1. Technical Field of the Invention

The present invention relates to a method and apparatus for optically reading out information from an object, and in particular, to the method and apparatus that use an image-forming lens for imaging a reflected light from an information code and an optical sensor for receiving an image from the image-forming lens.

2. Description of the Related Art

A code reader such as a bar-code reader has been known as a device to read out pieces of information from a bar code attached to objects. To read the information from the bar-code, a device called bar-code reader is required.

A handy type optical information reading apparatus is categorized as one of such devices and the apparatus is configured to read information such as a bar code or a two-dimensional code. Such an apparatus usually has a reading unit comprising an optical sensor, an optical image-forming means having an image-forming lens, and lighting means within a portable main unit. An object from which information is optically read (for example, a bar code, hereinafter referred to as "object") is illuminated by the lighting means through a reading window located at the end of the main unit. Thus, an image is formed by the optical sensor via the optical image-forming means by incorporating a reflection light of the object through the reading window.

A reading distance (i.e., distance from the optical information reading apparatus to the object) for reading an optical information is determined by optical characteristics (mainly by the depth of focus) of the optical image-forming means in the optical information reading apparatus with a certain range of distance. Therefore, the user of the optical information reading apparatus conducts the read operation by moving the reading apparatus (i.e., reading window) to an appropriate read position (i.e., best focus position) of the object. Recently, on the other hand, to widen the range of the readable distance, an optical information reading apparatus having an auto-focus unit has been developed, which can change the depth of focus by shifting a lens system. For example, the auto-focus unit which changes the depth of focus by shifting the lens system along its optical axis has been developed by the combination of a ball screw and a stepping motor (for example, Japanese Patent First Publication No. 7-319990).

However, the above auto-focus unit requires a fairly complex mechanism and control for the unit in spite of the advantage of stepless change of the depth of focus. Especially, the driving unit of the lens system shifting along a straight line becomes complex, thereby resulting in a large unit. Furthermore, since a moving part of the driving unit is heavy, the response speed becomes slow, resulting in disadvantage of the unit.

BRIEF SUMMARY OF THE INVENTION

The present invention has been made considering the above issues in the background art. It is therefore an object of the present invention to provide an optical information reading apparatus which can widen the range of the readable distance using a simple and small structure.

To achieve the above object, the optical information reading apparatus is characterized by having an image-forming lens fixed at a given point for imaging a reflection light from an information code, and an optical sensor for incorporating the image formed by the image-forming lens. The optical sensor is located at a predetermined position relative to the position of the image-forming lens. The optical information reading apparatus includes light path bending means for bending the light path of the reflection light a plurality of times, which is set up between the image-forming lens and the optical sensor, and shifting means for shifting the light path bending means. By changing the position of the light path bending means using the shifting means, a light path length between the image-forming lens and the optical sensor is changed.

The reflection light from the information code is inputted into the optical sensor after passing the image-forming lens and bended by the light path bending means a plurality of times. The light path length between the image-forming lens and the optical sensor is changed by displacing the position of the light path bending means using the shifting means. As a result, an appropriate reading distance (i.e., best focus position) is obtained. Accordingly, a range of readable distance between the object and the optical information reading apparatus can be widen. In addition, since the light path bending means located between the image-forming lens and the optical sensor is configured to bend the light path a plurality of times, the light path bending means can be compact regarding the direction of optical axis of the image-forming lens, and also the light path length can be changed widely even though the displacement of the light path bending means is small.

To be specific, first of all, the light path bending means has at least two reflection surfaces which are configured so that the directions of an input light and an output light to and from the reflection surfaces are in parallel and opposite to each other. Using the above light path bending means, the light path length can be changed two times or more of the displacement distance of the light path bending means. The light path bending means may also be fabricated using at least a set of surfaces which bend the light path two times at 90 degrees. In this case, the light path bended by the reflection surface may be in parallel with or perpendicular to the optical axis of the image-forming lens. The reflection surface is composed of, for example, a reflection mirror or a prism.

The second, the light path bending means has two reflection mirrors which bend the light path to cross by itself, and the shifting means which shifts the mirrors along the optical axes of the image-forming lens and the optical sensor, respectively. Since the light path is configured to cross between the image-forming lens and the optical sensor, both of the image-forming lens and the optical sensor can be set up in a small area, resulting in expansion of freedom of their arrangement.

It is possible to displace the two reflection mirrors together by bonding the two mirrors as a unit using the shifting means. It is also possible to shift the two reflection mirrors at the same time and the same distance by using a single driver. In either case, a larger change of the light path length than the displacement distance of the reflection mirrors is obtained. Accordingly, the shifting means can be simplified.

In addition, it is possible to configure that the light path bended by the two reflection mirrors forms an isosceles triangle with two reflection points on each mirror and one cross point formed by both of the incident light and the reflection light to and from the reflection mirrors. Arranging the image-forming lens and the optical sensor so that their two optical axes cross at right angles, it is also possible to configure that the light path bended by the reflection mirrors forms an isosceles right triangle with two reflection points on each mirror and one cross point formed by the incident light and the reflection light to and from the reflection mirrors.

In the present invention, the optical information reading apparatus includes distance measurement means for measuring a distance between the information code and the optical information reading apparatus and control means for controlling the shifting means based on the measurement result of the distance measurement means. Using the distance measurement means, the distance between the information code and the optical information reading apparatus is measured automatically, for instance, without guessing the distance by the eye. As a result, it becomes possible to displace the light path bending means automatically to the position of the best focus.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but is for the purpose of explanation and understanding only.

In the drawings.

DESCRIPTION OF THE PREFERRED EMBODIMENTS

Embodiments of the present invention applied to a handy type optical information reading apparatus (hereinafter, referred to as reading apparatus) for a two-dimensional code will now be described below by referring to figures.

First Embodiment

A first embodiment of the present invention will be explained referring to FIG. 1 and FIG. 6. A two-dimensional code reading apparatus, that is, an optical information reading apparatus of the first embodiment, has a main unit 1 which is a lengthwise shape and a size suitable for portability and operation with a single hand as partly shown in FIG. 2. As described later, the main unit 1 is equipped with an optical system (i.e., reading means) at the end of the main unit for reading the two-dimensional code Q (refer to FIG. 1 and FIG. 3.), for example, a QR code printed on an object from which optical information is read (hereinafter, referred to as "object") such as a label P (refer to FIG. 5 and FIG. 6) mounted on commercial products. A rectangular transparent reading window 1a is formed at the end of the main unit 1.

Figure 3:
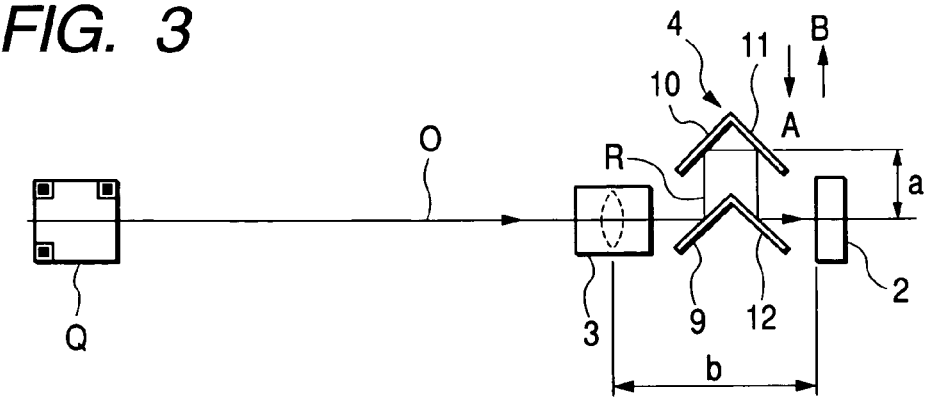
FIG. 3 is a plane view of a main part of a focus depth adjustment unit in the first embodiment.

The optical system includes an optical sensor 2, an image-forming lens 3, a focus depth adjustment unit 4 located between the optical sensor 2 and the image-forming lens 3, lighting means 5, and a pointer light irradiation unit 6 (refer to FIG. 5). The focus depth adjustment unit 4 and the pointer light irradiation unit 6 will be described later in detail. As shown in FIGS. 1, 3, and 5, the optical sensor 2, which is, for instance, CCD (i.e., Charge Coupled Device) area sensor, is arranged (i.e., a second position: P2) at the center of the main unit facing the reading window 1a. The image-forming lens 3 is positioned (i.e., a first position: P1) in front of the optical sensor 2. Although not shown and not explained in detail, the image-forming lens 3 includes a plurality of lenses within a lens-barrel. An optical axis O of the image-forming lens 3 extends perpendicularly to the center of the reading window 1a, and the optical sensor 2 is positioned on the extended line of the optical axis O in accordance with the center of the axis.

The lighting means 5 includes a light source LED (i.e., Light Emitting Diode) 7 and a light lens 8 positioned in front of the LED 7 for converging and diffusing the light from the LED 7. A plurality of LED 7 and a plurality of light lenses 8 are arranged facing the reading window 1*a* in the vicinity of the image-forming lens 3. With the above configuration, an illumination light from the lighting means 5 is irradiated on the two-dimensional code Q printed on the object (for instance, a label P) through the reading window 1*a*. The reflected light from the two dimensional code Q is incorporated into the main unit through the reading window 1*a*, and an image is formed on the optical sensor 2 via the image-forming lens 3 and the focus depth adjustment unit 4. Thus, the two-dimensional code Q is read by the optical information reading apparatus.

Figure 6:
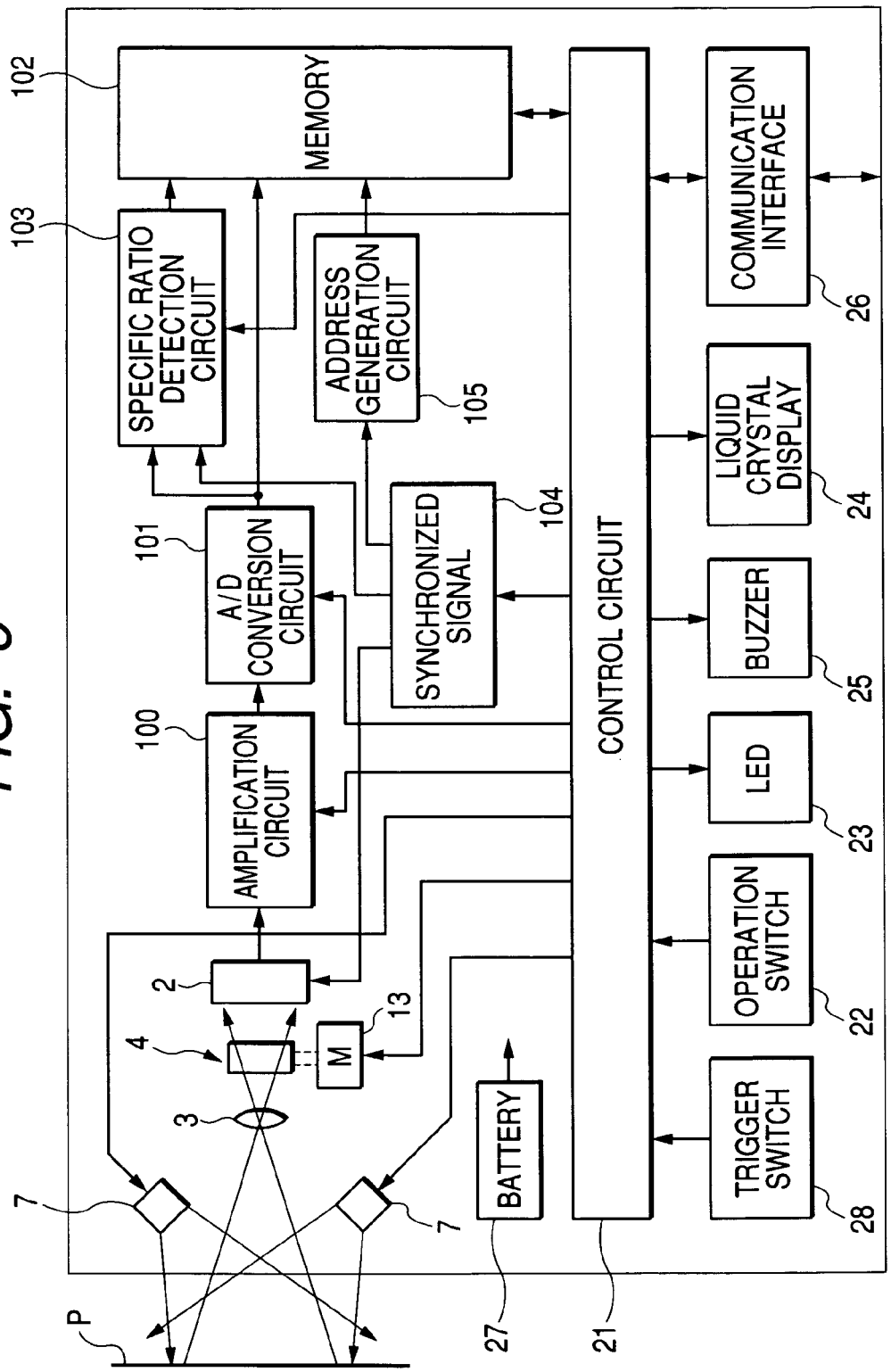
FIG. 6 is a schematic block diagram showing an electrical configuration of an optical information reading apparatus in the first embodiment.

FIG. 6 schematically shows an electric arrangement of the optical information reading apparatus for the two-dimensional code in the present invention. A control circuit 21, which is primarily constituted of a microprocessor, is included in the main unit 1 for totally controlling the optical information reading apparatus and for processing a decoding process. The control circuit 21 controls, for example, an amplification circuit 100, an AC to DC conversion circuit 101, a memory 102, a specific ratio detection circuit 103, a synchronized signal generation circuit 104, and an address generation circuit 105. An image signal of the optical sensor 2 is amplified by the amplification circuit 100, then converted into a digital signal by the AC to DC conversion circuit 101, and stored in the memory 102 as a visual data. At the same time, a specific pattern in the visual data is detected by the specific ratio detection circuit 103. The optical sensor 2, the specific ratio detection circuit 103, and the address generation circuit 105 are supplied with a synchronized signal by the synchronized signal generation circuit 104.

An operation switch 22 for inputting a various type of command, an indication LED 23, and a liquid crystal display are arranged on upper side of the main unit of the optical information reading apparatus. Also, for instance, an information buzzer 25, a communication interface 26 for communicating with outside, and a secondary battery 27 for driving power are set up within the main unit 1. A trigger switch 28 for commanding the read operation is disposed on the side of the main unit 1. The trigger switch is configured to operate, for instance, with two pushing steps, that is, with a first pushing step (so called a half-push state) for measurement operation (This step will be described later in detail.) and with a second pushing step for read operation.

The focus depth adjustment unit 4 will be described in detail by referring to FIG. 1 and FIGS. 3 to 5. As shown in FIG. 1 and FIG. 3, the focus depth adjustment unit 4 includes four reflection mirrors, a first reflection mirror 9, a second reflection mirror 10, a third reflection mirror 11, and a fourth reflection mirror 12. These mirrors are used as light path bending means for bending a light path a plurality of times, in this case, four times, of a reflected light between the image-forming lens 3 and the optical sensor 2.

The first reflection mirror 9 is so arranged that the reflection surface inclines 45 degrees against the optical axis O of the image-forming lens 3, that is, if seen from above, the mirror 9 is set up to bend an incident reflection light from the object by 90 degrees to the direction of the second reflection mirror 10 (to the upper direction in FIGS. 1 and 3). The second reflection mirror 10 is located at right side (the upper side in FIGS. 1, 3) of the first reflection mirror 9 so that the reflection surface faces and is in parallel with that of the first reflection mirror 9 for bending the light from the mirror 9 by 90 degrees to the direction of the third reflection mirror 11 (i.e., the right direction in FIGS. 1, 3).

The third reflection mirror 11 is arranged adjacent to the second reflection mirror 10 so that the reflection surface makes a right angles with that of the second reflection mirror 10 for bending the light from the mirror 10 by 90 degrees to the direction of the fourth reflection mirror 12 (i.e., to the downward direction in FIGS. 1, 3). The fourth reflection mirror 12 is set up adjacent to the first reflection mirror 9 so that the reflection surface faces and is in parallel with that of the third reflection mirror 11 for bending the light from the third mirror 11 by 90 degrees to the direction of the optical sensor 2 (i.e., to the right direction in FIGS. 1 and 3).

That is, the focus depth adjustment unit 4 includes two sets of reflection surfaces (i.e., reflection mirrors) for bending a light path R by 90 degrees two times at each set of reflection surfaces. An incident light path of the light path R into the focus depth adjustment unit 4 is so bended within the unit as to be consequently in parallel (in this case, with the same optical axis) with an exiting light path from the unit. The light paths R bended by each reflection mirror 9 to 12 are in parallel with or cross at right angles with the optical axis O of the image-forming lens 3.

The first reflection mirror 9 and the fourth reflection mirror 12 are bonded and fixed to the main unit 1. On the other hand, the second reflection mirror 10 and the third reflection mirror 11 are bonded as a unit and are movable to the direction (i.e., the directions A and B indicated by arrows in FIGS. 1, 3) of the first reflection mirror 9 and the fourth reflection mirror 12. The second and the third reflection mirrors 10 and 11 move freely to the directions of the A and B using a shifting unit 13 (The shifting unit 13 will be described hereinafter). As a result, positions of the mirrors 10 and 11 are changed.

A distance between the fixed reflection mirrors 9, 12 and the movable reflection mirrors 10, 11 is changed by the mechanism described in the above, and as a result, a light path length between the image-forming lens 3 and the optical sensor 2 is changed. In this case, as shown in FIG. 3, the light path length becomes 2a+b if the distance between the image-forming lens 3 and the optical sensor is b. That is, the light path length changes two times of the displacement of the second and the third reflection mirrors 10, 11.

As shown in FIG. 1, the second and the third reflection mirrors 10, 11 are configured to stop at, for example, one of the three given positions each of which has a different distance of a. As a result, the light path length between the image-forming lens 3 and the optical sensor 2 changes according to the stop position of the mirrors 10, 11, resulting in changing the reading distance (best focus distance, that is, the distance between the reading window 1*a* and the object label P, appropriate for reading the label P) for reading the object with the best focus.

Figure 1A:
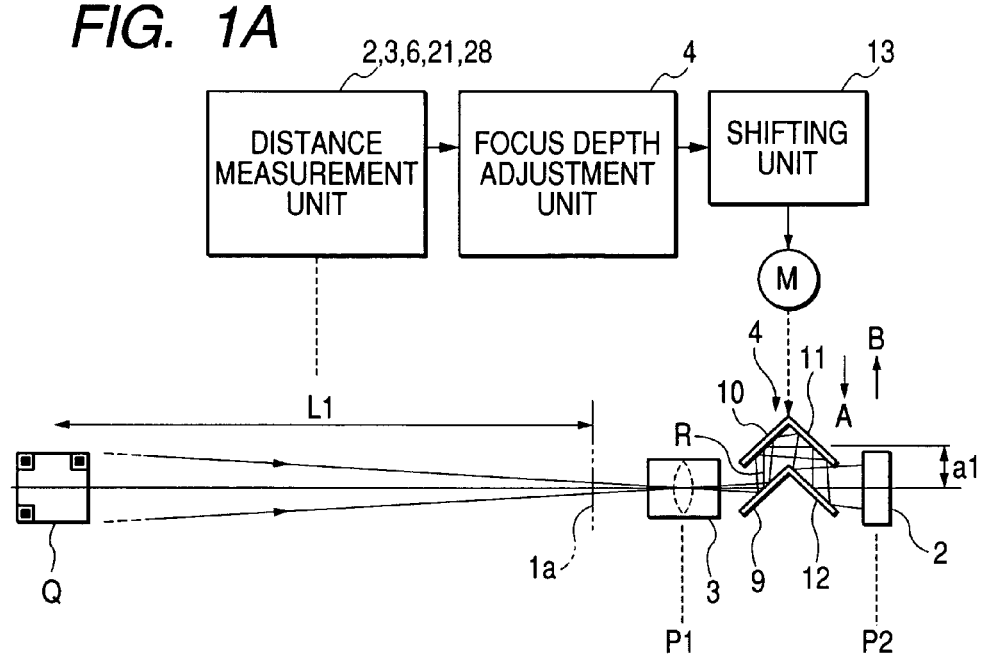
FIG. 1A is a plane view showing a relation between reading distance L1 and stop position a1 of reflection mirrors in the first embodiment of the present invention.
Figure 1B:
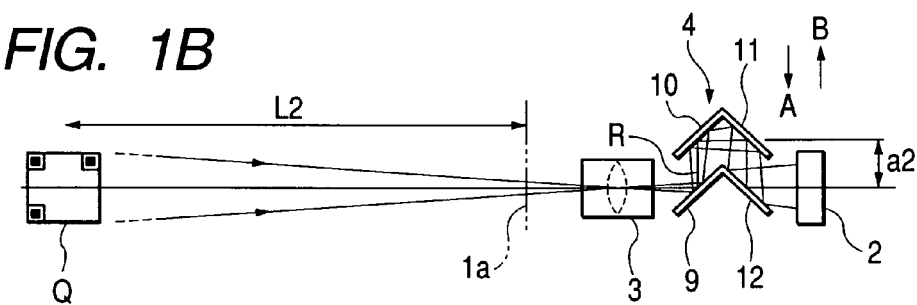
FIG. 1B is a plane view showing a relation between reading distance L2 and stop position a2 of reflection mirrors in the first embodiment.
Figure 1C:
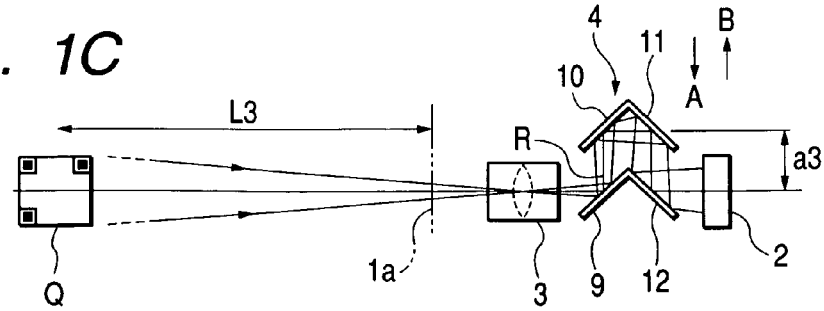
FIG. 1C is a plane view showing a relation between reading distance L3 and stop position a3 of reflection mirrors in the first embodiment.
Figure 2:
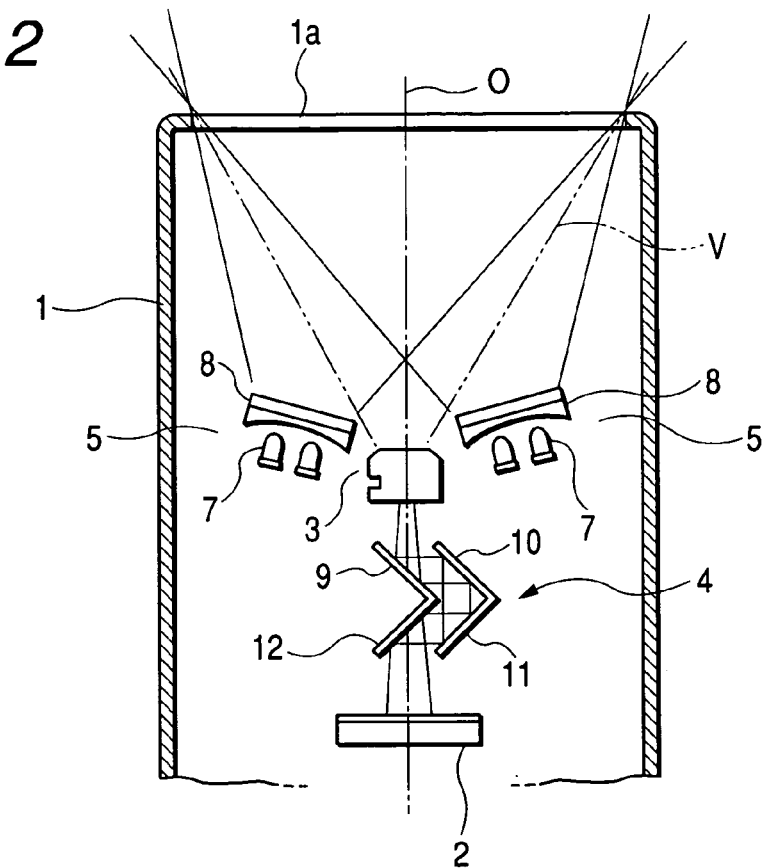
FIG. 2 is a schematic cross sectional view of an end part of an optical information reading apparatus in the first embodiment.

FIG. 1A is an illustration showing that the second and the third reflection mirrors 10, 11 stop at a first stop position. In this case, a distance a1 between the mirrors 10, 11 and the fixed reflection mirrors 9, 12 becomes relatively short, resulting in relatively long reading distance L1, for example, 300 mm±70 mm, for reading the object with best focus. FIG. 1B is also an illustration showing that the mirrors 10, 11 stop at a second stop position. In this case, a distance a2 between the mirrors 10, 11 and the mirrors 9, 12 becomes middle, resulting in relatively middle reading distance L2, for instance, 200 mm±50 mm, for the best focus for reading the object. FIG. 1C shows an illustration that the mirrors 10, 11 stop at a third stop position. In this case, a distance a3 between the mirrors 10, 11 and the mirrors 9, 12 becomes long, resulting in relatively short reading distance L3, for example, 120 mm±30 mm, for reading the object with best focus.

Figure 4:
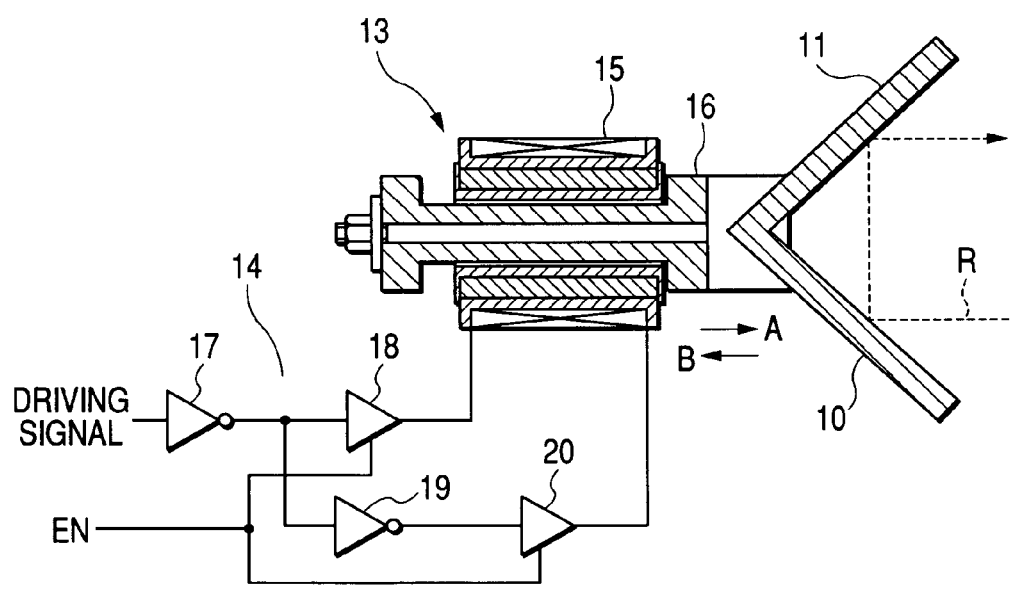
FIG. 4 is a schematic view showing a configuration of shifting means in the first embodiment.

FIG. 4 is a schematic view showing the shifting unit 13 and a driving circuit 14 for driving the unit 13 in order to shift the second and the third reflection mirrors 10, 11 to both directions of A and B indicated by arrows. The shifting unit 13 includes a fixed electromagnet 15 and a shifter 16 shifting the reflection mirrors to both directions of arrowed A and B by the fixed electromagnet 15. The second and the third reflection mirrors 10, 11 are attached at one of the ends of the shifter 16. The shifter 16 includes a permanent magnet. One of the ends of the magnet is, for instance, North-pole and the other is South-pole.

The driving circuit 14 transmits a driving signal from the control circuit 21 to one of the terminals of the electromagnet 15 via a first inversion circuit 17 and a first amplification circuit 18. An output signal of the first inversion circuit 17 is given to the other terminal of the electromagnet 15 through a second inversion circuit 19 and a second amplification circuit 20. An enable signal (i.e., indicated in "EN") from the control circuit 21 is given to the first and second amplification circuits 18 and 20.

A driving pulse from the driving circuit 14 is given to the electromagnet 15 of the shifting unit 13 in response to the driving signal and the enable signal from the control circuit 21. Then, the shifter 16 is shifted a distance according to the number of the pulses to the directions of A and B indicated by arrows, and the sifter is held there. As a result, the second and the third reflection mirrors 10, 11 are selectively shifted to one of the first, second, and third stop positions by the control circuit 21.

Figure 5A:
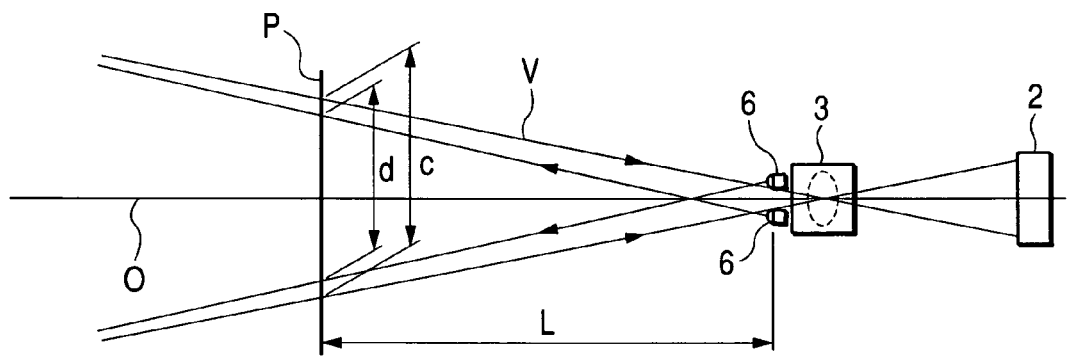
FIG. 5A is a schematic plane view explaining distance measurement means in the first embodiment.
Figure 5B:
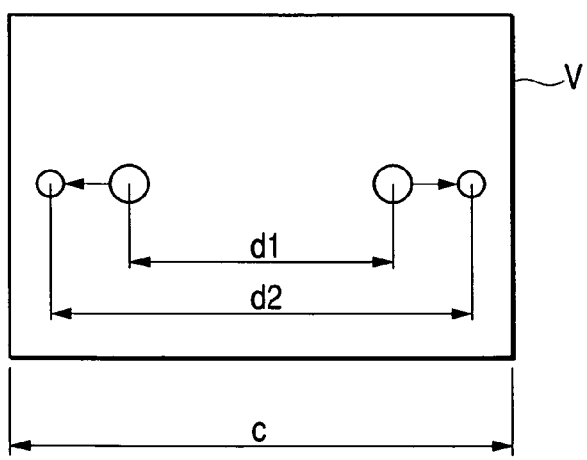
FIG. 5B is a schematic plane view showing a photographic image of distance measurement means in the first embodiment.

As shown in FIGS. 5A and 5B, a distance measurement unit is set up for measuring the distance from the main unit 1 (i.e., the reading window 1a) to the object (i.e., the label P) in this embodiment. As shown in FIG. 5A, a pointer light irradiation unit 6 including, for example, a pair of LD (Laser Diode) located at right and left, is arranged close to the image-forming lens 3 with an oblique irradiation direction. The pointer light irradiation unit 6 is located within a reading visual field V of the image-forming lens 3 and the optical sensor 2, and is configured to irradiate a pointer light (for example, red spot light) on the right and left parts of the object (i.e., the label P) through the reading window 1a.

Because the irradiation direction of the pointer light from the pointer light irradiation unit 6 has a smaller angle than that of the outer edge line of the reading visual field V, an irradiation position of the pointer light on the object changes according to the distance L between the pointer light irradiation unit 6 and the object (i.e., the label P). That is, as shown in FIG. 5B, if the object is located relatively close to the reading window 1a, the distance between the two pointer lights on the object is d1. On the other hand, if the object is located far from the reading window 1a, the-two pointer lights irradiate positions close to the outer edges of the reading visual field V (i.e., The two positions are more distant to each other). In this case, the distance between the two positions becomes, for is example, d2.

If the first pushing step for the trigger switch 28 is executed, the control circuit 21 makes the switch "ON" of the pointer light irradiation unit 6 for irradiating the pointer light, incorporates a photographic image of the optical sensor 2, detects the positions of the pointer lights from the photographic image data taken by the optical sensor 2, and calculates the distance d between the two pointer lights. Then, comparing the ratio d/c (d: distance between the two pointer lights, c: width of the reading visual field V) with a predetermined value in a data table, the distance L (three levels, that is, long, middle, and short in this embodiment) is calculated.

The control circuit 21 functions as a controller for shifting the second and the third reflection mirrors 10, 11 to a predetermined stop position in response to a measurement result (i.e., the calculated distance L) of the distance measurement unit through controlling the shifting unit 13 (i.e., the electromagnet 15). That is, if the distance L is evaluated as a long distance, the second and the third reflection mirrors 10, 11 are stopped at the first stop position. If evaluated as a middle, the mirrors 10, 11 are stopped at the second stop position, and also if evaluated as a short, the mirrors 10, 11 are stopped at the third stop position.

In the above two-dimensional code reading apparatus, when the read operation is conducted for a two-dimensional code Q printed on a label P, the apparatus has to be apart an appropriate distance from the label P, and also the reading window 1a has to face the label P. Under the above configuration, the pushing step is executed by pushing a trigger switch 28 attached on the side of the main unit 1. With the first pushing step of the trigger switch 28, the distance L to the label P from the pointer light irradiation unit 6 is measured. According to the measured distance L, the second and the third reflection mirrors 10, 11 of the focus depth adjustment unit 4 are shifted to the predetermined stop position (i.e., one of the three stop positions).

The read operation for the two-dimensional code Q is conducted with the second pushing step of the trigger switch 28. Procedure of the read operation is, as described in the above, as follows. An illumination light from the lighting means 5 is irradiated on the two-dimensional code Q printed on the label P through the reading window 1a. The reflected light from the two-dimensional code Q is incorporated into the main unit through the reading window 1a, and an image is formed on the optical sensor 2 via the image-forming lens 3 and the focus depth adjustment unit 4.

As shown in FIG. 1 and FIG. 3, the reflection light passing through the image-forming lens 3 is inputted into the optical sensor 2 after bended by 90 degrees at each reflection mirror, that is, at the first reflection mirror 9, at the second reflection mirror 10, at the third reflection mirror 11, and at the fourth reflection mirror 12 of the focus depth adjustment unit 4. The second and the third reflection mirrors 10, 11 are stopped at one of the three stop positions, thereby changing the light path length from the image-forming lens 3 to the optical sensor 2 according to the each stop position, and resulting in an appropriate light path length for reading the object (i.e., length for best focus).

If the length L to the label P is relatively long, as shown in FIG. 1A, the second and the third reflection mirrors 10, 11 are stopped at the first stop position. In this case, distance a1 between the mirrors 10, 11 and the fixed reflection mirrors 9, 12 is relatively small. Then, the light path length from the image-forming lens 3 to the optical sensor 2 becomes short. As a result, the appropriate reading length (i.e., length for best focus) becomes long, and the reading is implemented at there. Also, if the length L is middle, as shown in FIG. 1B, the mirrors 10, 11 are stopped at the second stop position. In this case, the distance between the mirrors 10, 11 and the fixed reflection mirrors 9, 12 becomes a2, resulting in middle light path length from the image-forming lens 3 to the optical sensor 2. As a result, the appropriate reading length (i.e., length for best focus) becomes middle, and the reading is executed thereat.

In the case of relatively short length L to the label P, as shown in FIG. 1C, the mirrors 10, 11 are stopped at the third stop position. In this case, the distance between the mirrors 10, 11 and the fixed reflection mirrors 9, 12 becomes a3, resulting in long light path length. As a result, the appropriate reading length (i.e., length for best focus) becomes short, and the reading is executed at there. Then, the appropriate reading length is always obtained even if the label P is located at any distance, and fine reading can be achieved. Accordingly, the range of the readable length is much expanded.

In this embodiment, a plurality of reflection mirrors 9, 10, 11, and 12 are set up for bending the light path R between the image-forming lens 3 and the optical sensor 2. In addition, the focus depth adjustment unit 4 is equipped with the shifting unit 13 for changing the light path length by shifting the reflection mirrors 10, 11. As a result, the range of readable length can be expanded. The focus depth adjustment unit 4 in this embodiment has a different method from that of a traditional art for obtaining the length of the best focus. In the traditional art, the lens system is shifted along the optical axis for obtaining the best focus position. On the other hand, in this embodiment, the light path R is bended a plurality of times. Then, the light path length can be changed largely even though the shifting distance of the second and the third reflection mirrors 10, 11 is small. As a result, a small and quick response system is achieved.

Accordingly, the range of readable length can be expanded in this embodiment. In addition, the reading apparatus can be simplified and it becomes relatively small. Especially, in this embodiment, the distance measurement unit is set up for measuring the distance between the main unit 1 and the object (i.e., the label P). Since the second and the third reflection mirrors 10, 11 are shifted to an appropriate predetermined stop position by the shifting unit 13 based on the measurement result of the distance measurement unit, the mirrors 10, 11 can be shifted automatically, resulting in convenience. In addition, the distance measurement unit is simple. It is only equipped with the pointer light irradiation unit 6.

FIG. 7 to FIG. 10 show second to fifth embodiments, respectively. The second to fifth embodiments are examples of modification of the light path bending means (i.e., the focus depth adjustment unit) of the first embodiment. In those embodiments, for the sake of a simplified explanation, the identical or similar members to those of the first embodiment are given the same numerals with the first embodiment, thus no explanation thereon being provided.

Second Embodiment

Figure 7:
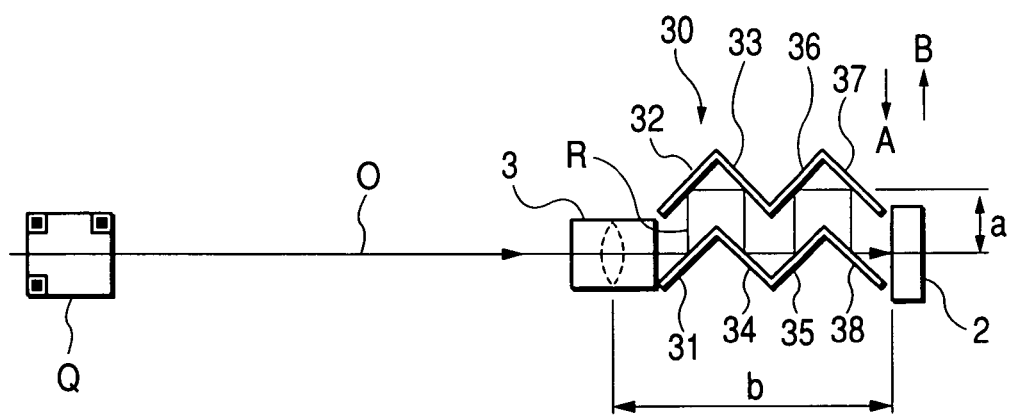
FIG. 7 is a plane view of a main part of a focus depth adjustment unit in the second embodiment of the present invention.

In the second embodiment, as shown in FIG. 7, a focus depth adjustment unit 30 as a light path bending means has, for example, four sets of reflection surfaces. One set of reflection surfaces bends a light path R two times by 90 degrees at each time, resulting in eight bendings of the light path R in total with the four sets of reflection surfaces. That is, the focus depth adjustment unit 30 has eight reflection mirrors from first to eight, that is, mirrors 31 to 38. A reflection light passed through the image-forming lens 3 is reflected by the first to eight reflection mirrors 31 to 38 by 90 degrees at each reflection mirror, and inputted into the optical sensor 2.

The first, the fourth, the fifth, and the eighth of the reflection mirrors 31, 34, 35, and 38 are bonded as a unit, and fixed in the main unit 1. On the other hand, the second, the third, the sixth, and the seventh reflection mirrors 32, 33, 36, and 37 are bonded as a unit, and shifted to directions A and B indicated by arrows by a shifting unit, resulting in change of position of the each mirror. By the change of the position, the distance between the fixed reflection mirrors 31, 34, 35, and 38 and the movable reflection mirrors 32, 33, 36, and 37 changes, thereby resulting in change of the light path length from the image-forming lens 3 to the optical sensor 2. In this case, the light path length becomes $4a+b$. That is, if the movable reflection mirrors 32, 33, 36, and 37 change the positions, the light path length is changed four times of the displacement of the mirrors 32, 33, 36, and 37.

Third Embodiment

Figure 8:
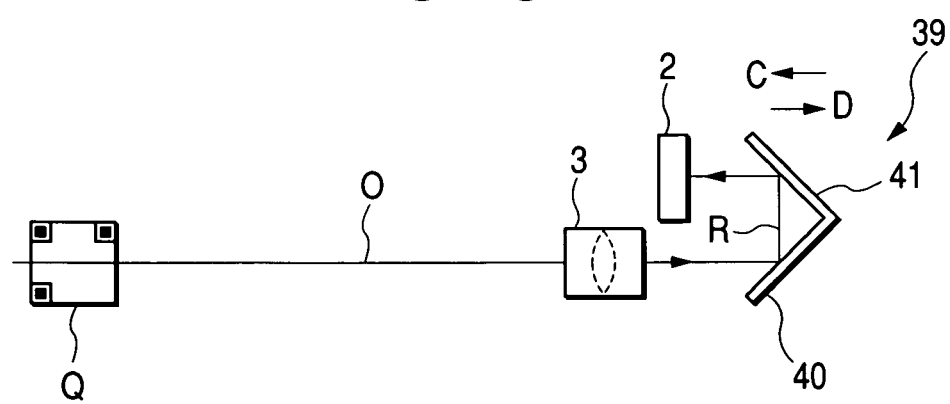
FIG. 8 is a plane view of a main part of a focus depth adjustment unit in the third embodiment of the present invention.

In the third embodiment, as shown in FIG. 8, a focus depth adjustment unit 39 as a light path bending means has, for example, a set of reflection surfaces. The set of reflection surfaces bends a light path R two times by 90 degrees at each time. That is, the focus depth adjustment unit 39 has a first reflection mirror 40 and a second reflection mirror 41 bonded as a unit at right angles, and a shifting unit for shifting the first and the second reflection mirrors 40 and 41 back and forth (i.e., the directions C and D indicated by arrows).

The optical sensor 2 is arranged at side (i.e., at upper right position in FIG. 8) of the image-forming lens 3 facing backward. A reflection light passed through the image-forming lens 3 is inputted into the optical sensor 2 after bended by the first and the second reflection mirrors 40 and 41 by 90 degrees at each mirror. The light path length can be changed by displacing the first and the second reflection mirrors 40 and 41 to the directions of C and D indicated by arrows.

Fourth Embodiment

Figure 9:
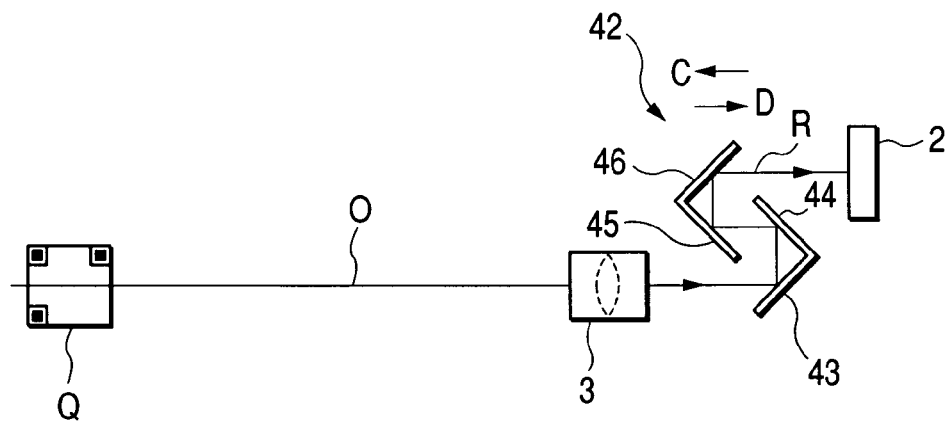
FIG. 9 is a plane view of a main part of a focus depth adjustment unit in the fourth embodiment of the present invention.

As shown in FIG. 9, in a fourth embodiment, a focus depth adjustment unit 42 as a light path bending means has, for example, two sets of reflection surface. The two sets of reflection surface bend a light path R four times by 90 degrees at each surface. That is, the focus depth adjustment unit 42 has a first reflection mirror 43 and a second reflection mirror 44 bonded as a unit at right angles, and a third reflection mirror 45 and a fourth reflection mirror 46 are also bonded as a unit at right angles.

A first shifting unit for shifting the first and the second reflection mirrors 43, 44 back and forth (i.e., the directions of C and D indicated by arrows) and a second shifting unit for shifting the third and the fourth reflection mirrors 45, 46 back and forth are set up independently. The first and the second shifting unit are configured to displace the mirrors 43, 44 and the mirrors 45, 46 between two positions, respectively. The optical sensor is arranged at back-sideward of the image-forming lens 3.

A reflection light passed through the image-forming lens 3 is inputted into the optical sensor 2 after bended by the first and the second reflection mirrors 43, 44 and the third and the fourth reflection mirrors 45, 46 by 90 degrees at each mirror. The light path length is changed into two different lengths by the two stop positions of the mirrors 43, 44, and also changed into two different lengths by the two stop positions of the mirrors 45, 46, resulting in four different light path lengths in total.

Fifth Embodiment

Figure 10A:
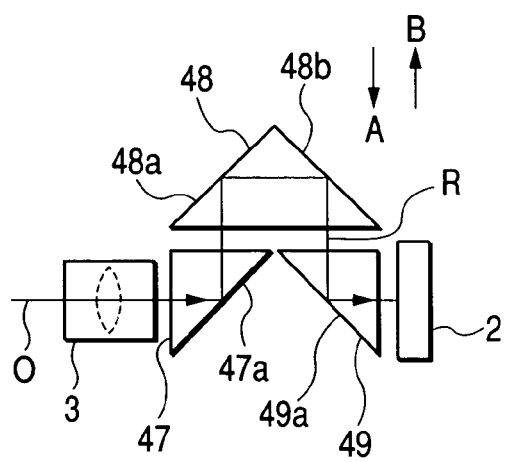
FIG. 10A is a plane view showing reflection surfaces composed of a plurality of prisms in one of the fifth embodiment of the present invention.

In the fifth embodiment shown in FIG. 10, a reflection surface forming light path bending means is consisted of a prism instead of a mirror. That is, in the case of FIG. 10A, a first to a third prisms 47 to 49 are arranged between the image-forming lens 3 and the optical sensor 2. In the first prism 47, an oblique plane forms a reflection surface 47a. In the second prism 48, two surfaces making a right angle to each other form reflection surfaces 48a, 48b. In the third prism 49, an oblique plane also forms a reflection surface 49a. The second prism 48 is shifted to the directions of A and B indicated by arrows.

Figure 10B:
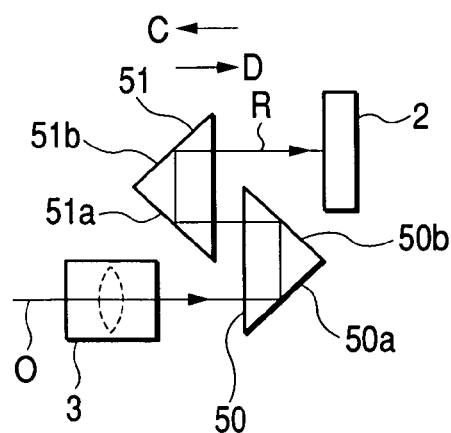
FIG. 10B is a plane view showing reflection surfaces composed of a plurality of prisms in the other fifth embodiment.

In the example shown in FIG. 10B, the first and the second prisms 50, 51 are arranged between the image-forming lens 3 and the optical sensor 2. In the prisms 50, 51, the surfaces making a right angles to each other form reflection surfaces 50a, 50b and 51a, 51b, respectively. The first prism 50 and the second prism 51 are shifted by a first shifting unit and a second shifting unit respectively to the directions of C and D indicated by arrows.

Sixth Embodiment

Next, the sixth embodiment will be described referring to FIG. 11 and FIG. 13. The sixth embodiment has many common members with the first embodiment. Therefore, for the sake of a simplified explanation, the identical or similar members to those of the first embodiment are given the same numerals with the first embodiment, thus no explanation thereon being provided.

The different feature of the sixth embodiment from the first embodiment is a configuration of a focus depth adjustment unit 61 as a light path bending means, which is located between the image-forming lens 3 and the optical sensor 2, for bending a light path R a plurality of times. In this embodiment, the optical sensor 2 is positioned at left backward (i.e., right backward in FIG. 11) of the image-forming lens 3 facing right direction (i.e., facing mirror 63).

Then, an optical axis of the image-forming lens 3 and an incident light axis of the optical sensor 2 are arranged to cross at right angles to each other.

Figure 12:
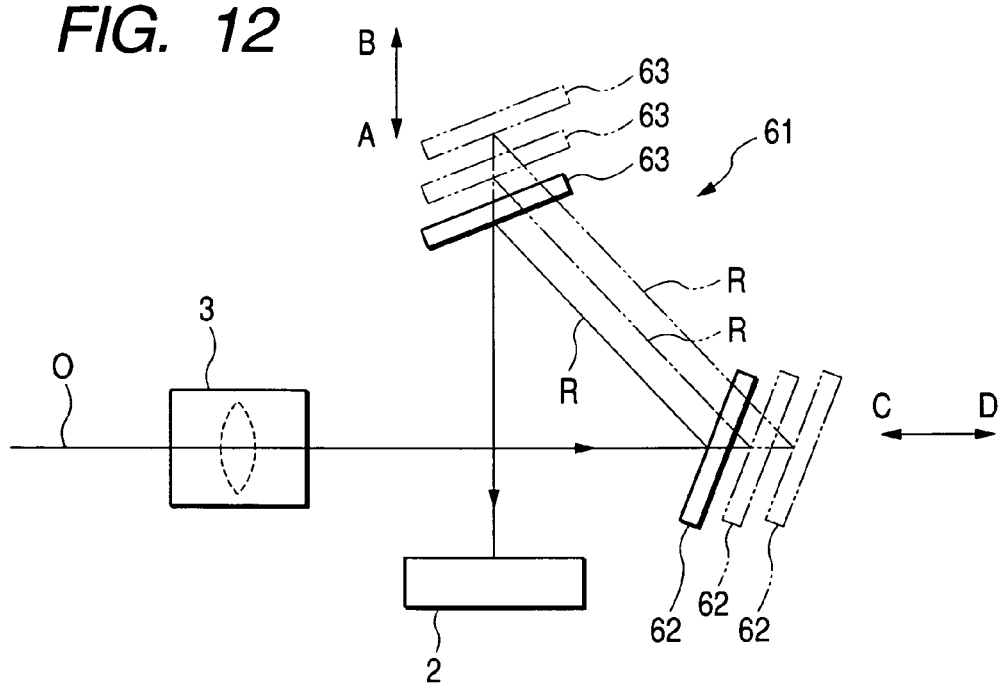
FIG. 12 is a plane view of a main part of a focus depth adjustment unit in the sixth embodiment.

For example, as shown in FIG. 12, the focus depth adjustment unit 61 includes a first and a second reflection mirrors 62 and 63 which bend a light path R between the image-forming lens 3 and the optical sensor 2 to cross by itself. The first reflection mirror 62 is arranged to incline the reflection surface against the optical axis O of the image-forming lens 3. Therefore, an incident reflection light coming along the optical axis O is bended to upper left direction (i.e., to the direction of mirror 63) in FIG. 12.

The second reflection mirror 63 is set up at upper left position of the reflection mirror 62 in FIG. 12 and arranged to make the reflection surface downward with a little to the right for bending the light from the mirror 62 downward (i.e., direction of the optical axis of the optical sensor 2), thereby resulting in inputting the reflection light into the optical sensor 2. Then, as shown in FIG. 12, a light path R bended by the two reflection mirrors 62, 63 forms an isosceles right triangle with two reflection points on the mirrors 62, 63 and one cross point formed by the incident light to the mirror 62 and the reflection light from the mirror 63.

A shifting unit 64 as shifting means is set up for changing the light path length by shifting the first reflection mirror 62 and the second reflection mirror 63 along the optical axes (i.e., the directions of C, D and A, B indicated by arrows) of the image-forming lens 3 and the optical sensor 2, respectively. In this embodiment, the reflection mirrors 62 and 63 are shifted same distance at a time by a single driving source (i.e., stepping motor) of the shifting unit 64.

Figure 13:
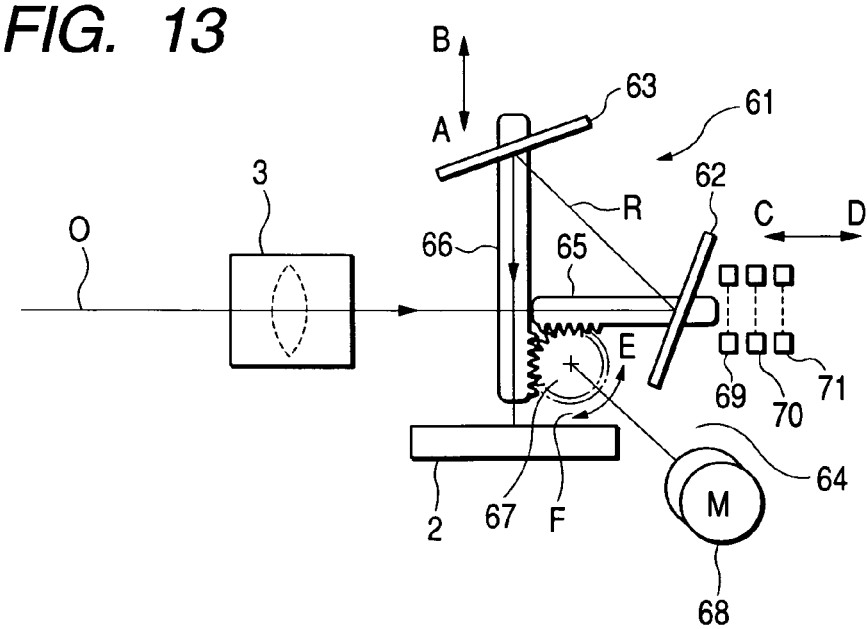
FIG. 13 is a schematic view showing a configuration of shifting means in the sixth embodiment.

That is, as shown in FIG. 13, the first reflection mirror 62 is attached on a first rack 65 which extends along the optical axis O of the image-forming lens 3. The first rack 65 is able to shift to the directions of C and D (i.e., directions of right and left in FIG. 13) indicated by arrows. On the other hand, the second reflection mirror 63 is attached on a second rack 66 extending along the optical axis of the optical sensor 2. The second rack 66 can be shifted to the directions of A and B (i.e., directions of up and down in FIG. 13) indicated by arrows. The first and the second racks 65 and 66 are arranged to cross at different height of plane which is in parallel with both moving directions of the racks 65 and 66.

A pinion 67 engaging with both the first and the second racks 65 and 66 is arranged at lower right of the cross point of the racks 65 and 66 in FIG. 13. The pinion 67 is directly bonded to the shaft of the stepping motor 68 and rotates freely back and forth (i.e., directions of E-and F indicated by arrows). The stepping motor 68 is controlled by a control circuit.

If the pinion 67 is rotated to the direction E by the stepping motor 68, the first rack 65, that is, the first reflection mirror 62 is shifted to the direction C, and also the second rack 66, that is, the second reflection mirror 63 is shifted to the direction A. On the other hand, if the pinion 67 is rotated to the direction F, the rack 65, that is, the mirror 62 is shifted to the direction D, and also the rack 66, that is, the mirror 63 is shifted to the direction B.

In addition, a plurality of transmission photo-sensors 69 to 71, in this case, for instance, three sets of photo-sensors, are set up side by side on right and left for detecting the position of the first rack 65. These photo-sensors 69 to 71 are configured to detect a light screening by a shadowing object (i.e., the first rack 65).

Figure 11A:
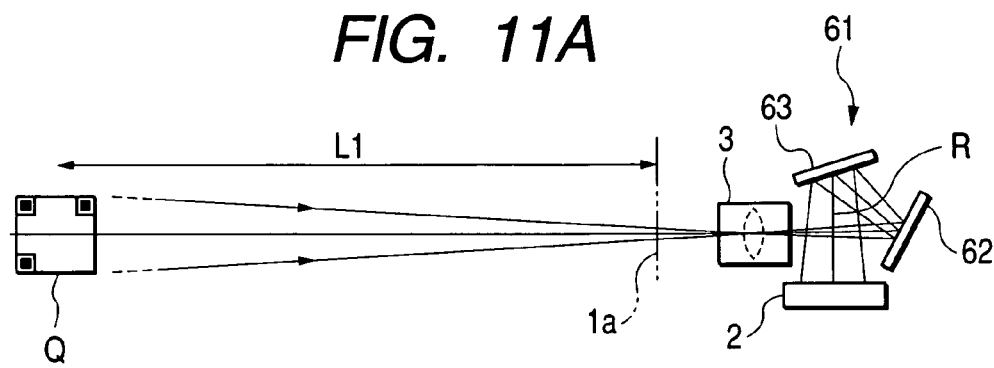
FIG. 11A is a plane view showing reading distance L1 and stop positions of reflection mirrors in the sixth embodiment of the present invention.
Figure 11B:
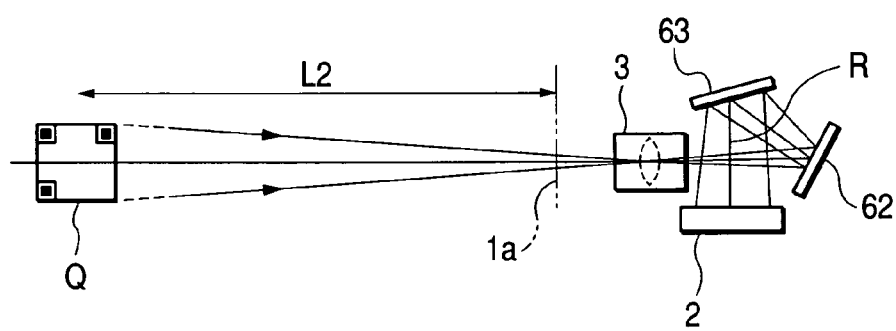
FIG. 11B is a plane view showing reading distance L2 and stop positions of reflection mirrors in the sixth embodiment.

If the first rack 65 is located at a position at where only a first photo-sensor 69 placed at left end of photo-sensors in FIG. 13 operates, the first and the second reflection mirrors 62, 63 are stopped at the first stop position (refer to FIG. 11A). If the rack 65 is located at a position at where the first photo-sensor 69 and a second photo-sensor 70 operate, the mirrors 62, 63 are stopped at the second stop position (refer to FIG. 11B). And, if the rack 65 is located at a position at where all photo-sensors 69 to 71 operate, the mirrors 62, 63 are stopped at the third stop position (refer to FIG. 11C).

Figure 11C:
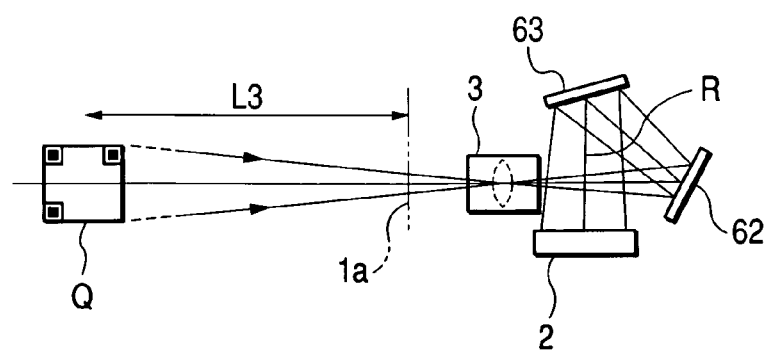
FIG. 11C is a plane view showing reading distance L3 and stop positions of reflection mirrors in the sixth embodiment.

As shown in FIG. 11A, if the first and the second reflection mirrors 62, 63 are positioned at the first stop position, the distance between the first and the second reflection mirrors 62 and 63 is relatively small, thereby resulting in short light path length. As a result, an appropriate reading length L1 becomes relatively long. If the mirrors 62, 63 are positioned at the second stop position, the distance between the reflection mirrors 62 and 63 is middle, thereby resulting in middle light path length. Then, the appropriate read length L2 becomes middle. And, as shown in FIG. 11C, if the mirrors 62, 63 are positioned at the third stop position, the distance between the reflection mirrors 62 and 63 is relatively large, thereby resulting in long light path length. Accordingly, an appropriate read length L1 becomes relatively long.

In this case, the control circuit 21 is also configured to control the shifting unit 64 (i.e., stepping motor 68) for shifting the first and the second reflection mirrors 62, 63 to a given stop position based on the measurement result (i.e., the evaluation result for the distance L) of the distance measurement means. That is, if the distance L is evaluated to be long, the reflection mirrors 62, 63 are stopped at the first stop position. If evaluated to be middle, the reflection mirrors 62, 63 are stopped at the second stop position. And, if evaluated to be short, the reflection mirrors 62, 63 are stopped at the third stop position.

As described in the above, the reading apparatus is equipped with the focus depth adjustment unit 61 in the sixth embodiment as the first embodiment for bending the light path R between the image-forming lens 3 and the optical sensor 2, and thereby changing the light path length. As a result, a range of the readable length is expanded and the configuration for achieving the expansion of the readable length can be simple and small. In addition, the shifting unit is also simplified. Accordingly, a plurality of superior advantages are achieved in the sixth embodiment.

Seventh Embodiment

Figure 14:
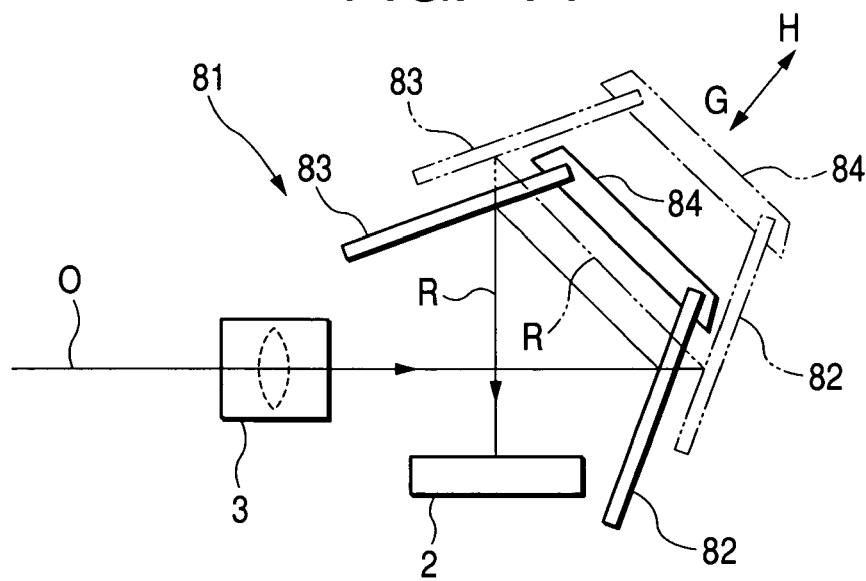
FIG. 14 is a plane view of a main part of a focus depth adjustment unit in the seventh embodiment of the present invention.

FIG. 14 shows a seventh embodiment of this invention. In the seventh embodiment, as the sixth embodiment, a focus depth adjustment unit 81 as a light path bending means includes a first reflection mirror 82 and a second reflection mirror 83 for bending a light path R between the image-forming lens 3 and the optical sensor 2 so that the light path R crosses at right angles by itself. The reflection mirrors 82 and 83 are bonded as a unit with a joint member 84. The joint member 84 is shifted back and forth by a shifting unit (not shown) to the oblique direction at 45 degrees (i.e., the directions of G and H indicated by arrows) against the optical axis of the image-forming lens 3.

Then, the light path length is changed by shifting together the reflection mirrors 82 and 83, which are bonded as a unit. In this case, the mirrors 82 and 83 have relatively large surfaces because the reflection points on the reflection surfaces of the mirrors move according to the positions of the first and the second reflection mirrors 82 and 83. With the above configuration, the identical or similar effects and advantages to those obtained in the sixth embodiment are achieved.

Eighth Embodiment

Figure 15:
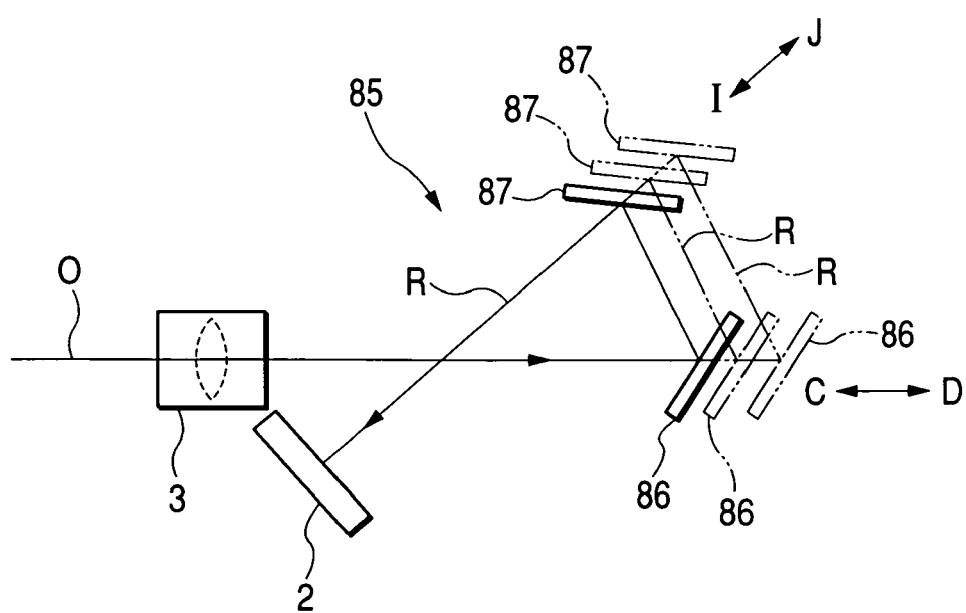
FIG. 15 is a plane view of a main part of a focus depth adjustment unit in the eighth embodiment of the present invention.

Eighth embodiment of the present invention is shown in FIG. 15. In the eighth embodiment, a focus depth adjustment unit 85 as a light path bending means includes a first reflection mirror 86 and a second reflection mirror 87 for bending a light path R between the image-forming lens 3 and the optical sensor 2 so that the light path R crosses by itself. The light path R bended by the two reflection mirrors 86 and 87 forms an isosceles acute triangle with two reflection points on the mirrors 86 and 87 and one cross point formed by both the incident light to the mirror 86 and the reflection light from the mirror 87. Accordingly, the optical axis of the optical sensor 2 has an oblique angle against that of the image-forming lens 3.

In this configuration, the first reflection mirror 86 is shifted by a shifting unit (not shown) along the optical axis O (i.e., the directions of C and D indicated by arrows) of the image-forming lens 3, and the second reflection mirror 87 is shifted by a shifting unit (not shown) along the optical axis (i.e., the directions of I and J indicated by arrows) of the optical sensor 2. The light path length is changed by shifting the positions of the reflection mirrors 86 and 87. With the configuration in the eighth embodiment, the identical or similar effects and advantages to those obtained in the sixth embodiment are achieved.

In the above embodiments, the stop position of the reflection mirror is automatically shifted using the distance measurement means for measuring the distance from the reading apparatus to the object. However, manual operation by the user for shifting the reflection mirror, thereby for changing the reading distance, is also possible. In this case, the distance measurement means is not always needed. The stop position of the reflection mirror can be measured, for example, by eye of the user. Another method such as switching the stop position to the next from the last position is also possible when failed in reading the object at one stop position and if the failure is estimated to be caused by out of focus of the code image (i.e., object). A displaying of the measurement result by the distance measurement means is also possible. It is out of question to be able to empty many other modified, or improved configurations regarding, for example, the distance measurement means and the shifting means.

The present invention is not limited to the above embodiments. The reading apparatus of this invention is not limited to a handy type one. For example, an apparatus incorporated and fixed in a FA (Factory Automation) system is also possible. The reading apparatus of this invention is not limited to read a two-dimensional code, but also read, for example, a bar code.

The present invention may be embodied in other specific forms without departing from the spirit or essential characteristics of it. The present embodiments are therefore to be considered in all respects as illustrative and not restrictive, the scope of the present invention being indicated by the appended claims rather than by the foregoing description and all changes which come within the meaning and range of equivalency of the claims are therefore intended to be embraced therein. It is possible to implement many other modified, or improved embodiments by skilled people.

What is claimed is:

1. An apparatus for optically reading information from an object, the apparatus comprising:
 image-forming means fixed at a first position in the apparatus and imaging a reflection light from the object;
 an optical sensor fixed at a second position relative to the first position in the apparatus and receiving an image formed by the image-forming means;
 light path bending means bending the reflection light between the image-forming means and the optical sensor a plurality of times; and
 shifting means shifting the light path bending means in response to information of a distance between the object and the apparatus so that a light path length between the image-forming means and the optical sensor is changed,
 wherein the light path bending means includes an optical member having at least two reflection surfaces which bend a light path of the reflection light so that an input light path direction to the reflection surface and an output light path direction from the reflection surface are in parallel and opposite to each other.

2. An apparatus as claimed in claim 1, wherein the light path bending means includes the optical member having at least a set of reflection surfaces which bend the light path two times by 90 degrees.

3. An apparatus as claimed in claim 2, wherein a direction of the light path bended by the reflection surface includes a direction which is in parallel with and perpendicular to an optical axis of the image-forming means.

4. An apparatus as claimed in claim 3, wherein the reflection surface is composed of a surface of one member selected from a group of optical members consisting of a reflection mirror or a prism.

5. An apparatus as claimed in claim 2, wherein the reflection surface is composed of a surface of one member selected from a group of optical members consisting of a reflection mirror and a prism.

6. An apparatus as claimed in claim 1, wherein a direction of the light path bended by the reflection surfaces includes a direction which is in parallel with and perpendicular to an optical axis of the image-forming means.

7. An apparatus as claimed in claim 6, wherein the reflection surface is composed of a surface of one member selected from a group of optical members consisting of a reflection mirror or a prism.

8. An apparatus as claimed in claim 1, wherein the reflection surface is composed of a surface of one member selected from a group of optical members consisting of a reflection mirror and a prism.

9. An apparatus as claimed in claim 1, further comprising distance measurement means for measuring the distance between the object and the apparatus and control means for controlling the shifting means in response to information of the distance measured by the distance measurement means.

10. An apparatus for optically reading information from an object, the apparatus comprising:
   image-forming means fixed at a first position in the apparatus and imaging a reflection light from the object;
   an optical sensor fixed at a second position relative to the first position in the apparatus and receiving an image formed by the image-forming means;
   light path bending means bending the reflection light between the image-forming means and the optical sensor a plurality of times; and
   shifting means shifting the light path bending means in response to information of a distance between the object and the apparatus so that a light path length between the image-forming means and the optical sensor is changed,
   wherein the light path bending means includes an optical member having two reflection surfaces which bend the light path so that an incident light and a reflection light to and from the reflection surfaces cross to each other and the shifting means which shifts the two reflection surfaces along optical axes of the image-forming means and the optical sensor, respectively.

11. An apparatus as claimed in claim 10, wherein the reflection surfaces are provided by two members bonded as a single unit and the two members are to be displaced together by the shifting means.

12. An apparatus as claimed in claim 11, wherein the light path bended by the two reflection surfaces forms an isosceles triangle with two reflection points on each reflection surface and one cross point formed by both of the incident light and the reflection light to and from the reflection surfaces.

13. An apparatus as claimed in claim 12, wherein two optical axes of the image-forming means and the optical sensor are configured to cross at right angles and the light path bended by the two reflection surfaces forms an isosceles right triangle with two reflection points on each reflection surface and one cross point formed by both of the incident light and the reflection light to and from the reflection surfaces.

14. An apparatus as claimed in claim 11, wherein two optical axes of the image-forming means and the optical sensor are configured to cross at right angles and the light path bended by the two reflection surfaces forms an isosceles right triangle with two reflection points on each reflection surface and one cross point formed by both of the incident light and the reflection light to and from the reflection surfaces.

15. An apparatus as claimed in claim 10, wherein each reflection surface are provided by two members shifted in each direction at the same time and the same distance by using a single driver.

16. An apparatus as claimed in claim 15, wherein the light path bended by the two reflection surfaces forms an isosceles triangle with two reflection points on each reflection surface and one cross point formed by both of the incident light and the reflection light to and from the reflection surfaces.

17. An apparatus as claimed in claim 16, wherein two optical axes of the image-forming means and the optical sensor are configured to cross at right angles and the light path bended by the two reflection surfaces forms an isosceles right triangle with two reflection points on each reflection surface and one cross point formed by both of the incident light and the reflection light to and from the reflection surfaces.

18. An apparatus as claimed in claim 15, wherein two optical axes of the image-forming means and the optical sensor are configured to cross at right angles and the light path bended by the two reflection surfaces forms an isosceles right triangle with two reflection points on each reflection surface and one cross point formed by both of the incident light and the reflection light to and from the reflection surfaces.

19. An apparatus as claimed in claim 10, wherein the light path bended by the two reflection surfaces forms an isosceles triangle with two reflection points on each reflection surface and one cross point formed by both of the incident light to the reflection surface and the reflection light from the reflection surface.

20. An apparatus as claimed in claim 19, wherein two optical axes of the image-forming means and the optical sensor are configured to cross at right angles and the light path bended by the two reflection surfaces forms an isosceles right triangle with two reflection points on each reflection surface and one cross point formed by both of the incident light and the reflection light to and from the reflection surfaces.

21. An apparatus as claimed in claim 10, wherein two optical axes of the image-forming means and the optical sensor are configured to cross at right angles and the light path bended by the two reflection surfaces forms an isosceles right triangle with two reflection points on each reflection surface and one cross point formed by both of the incident light to the reflection surface and the reflection light from the reflection surface.

22. An apparatus as claimed in claim 10, further comprising distance measurement means for measuring the distance between the object and the apparatus and control means for controlling the shifting means in response to information of the distance measured by the distance measurement means.

* * * * *